US010813149B2

(12) United States Patent
Kim

(10) Patent No.: US 10,813,149 B2
(45) Date of Patent: Oct. 20, 2020

(54) METHOD FOR TRANSMITTING/RECEIVING V2X MESSAGE IN LOCAL NETWORK IN WIRELESS COMMUNICATION SYSTEM AND APPARATUS FOR SAME

(71) Applicant: LG ELECTRONICS INC., Seoul (KR)

(72) Inventor: Laeyoung Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 281 days.

(21) Appl. No.: 16/071,297

(22) PCT Filed: Jan. 23, 2017

(86) PCT No.: PCT/KR2017/000784
§ 371 (c)(1),
(2) Date: Jul. 19, 2018

(87) PCT Pub. No.: WO2017/126948
PCT Pub. Date: Jul. 27, 2017

(65) Prior Publication Data
US 2020/0260511 A1    Aug. 13, 2020

Related U.S. Application Data

(60) Provisional application No. 62/294,299, filed on Feb. 11, 2016, provisional application No. 62/281,187, filed on Jan. 21, 2016.

(51) Int. Cl.
*H04W 76/00* (2018.01)
*H04W 4/44* (2018.01)
(Continued)

(52) U.S. Cl.
CPC ............. *H04W 76/14* (2018.02); *H04W 4/44* (2018.02); *H04W 24/02* (2013.01); *H04W 76/27* (2018.02); *H04W 92/18* (2013.01)

(58) Field of Classification Search
CPC .......... H04W 4/40; H04W 4/44; H04W 4/46; H04W 4/48; H04W 4/70; H04W 24/02;
(Continued)

(56) References Cited

U.S. PATENT DOCUMENTS 9,084,093 B2 *  7/2015  Watfa .................... H04W 8/082
9,439,060 B2 *  9/2016  Liu ....................... H04W 8/082
(Continued)

FOREIGN PATENT DOCUMENTS

WO       2015050392 A1      4/2015
WO       2015/142082 A1     9/2015

OTHER PUBLICATIONS

5G PPP: "5G Automotive Vision", 5G PPP White Papers, pp. 1-67, Oct. 20, 2015, see pp. 7, 29, 35, 47.
(Continued)

*Primary Examiner* — Tri H Phan
(74) *Attorney, Agent, or Firm* — Dentons US LLP

(57) ABSTRACT

One embodiment of the present invention provides a method for transmitting/receiving a vehicle-to-everything (V2X) message by a user equipment (UE) in a wireless communication system, the method comprising the steps of: transmitting/receiving a V2X message through a long-time evolution (LTE) Uu interface of a first local network; receiving local network boundary-related information from a first base station of the first local network; and determining execution of one or more of transmission and reception of a V2X message through a PC5 interface during a SIPTO period, on the basis of the local network boundary-related information.

13 Claims, 12 Drawing Sheets

(51) Int. Cl.
*H04W 92/10* (2009.01)
*H04W 76/14* (2018.01)
*H04W 76/27* (2018.01)
*H04W 24/02* (2009.01)
*H04W 92/18* (2009.01)

(58) Field of Classification Search
CPC ..... H04W 76/00; H04W 76/10; H04W 76/14; H04W 76/20; H04W 76/27; H04W 92/00; H04W 92/10; H04W 92/16; H04W 92/18
See application file for complete search history.

(56) References Cited

U.S. PATENT DOCUMENTS

| | | | | |
|---|---|---|---|---|
| 9,826,389 | B2* | 11/2017 | Karampatsis | H04W 8/082 |
| 9,930,597 | B2* | 3/2018 | Ahmad | H04W 36/125 |
| 10,321,358 | B2* | 6/2019 | Kim | H04L 5/00 |
| 2014/0329535 | A1 | 11/2014 | Sadiq et al. | |
| 2015/0065142 | A1 | 3/2015 | Song | |
| 2015/0208281 | A1* | 7/2015 | Kim | H04W 28/12 370/235 |

OTHER PUBLICATIONS

LG Electronics: "Discussion on enhancement for PC5 based V2V resource allocation", R1-157435, 3GPP TSG RAN WG1 Meeting #83, Anaheim, USA, Nov. 15-22, 2015.
3GPP TR 36.885 V0.4.0, "TSGRAN; Study on LTE-based V2X Services (Release 14)", Dec. 4, 2015, pp. 6-11.
CATT: "Further discussion on resource allocation mechanism in PC5-based V2V", R1-157449, 3GPP TSG Ran WG1 Meeting #83, Anaheim, USA, Nov. 15-22, 2015.

* cited by examiner

METHOD FOR TRANSMITTING/RECEIVING V2X MESSAGE IN LOCAL NETWORK IN WIRELESS COMMUNICATION SYSTEM AND APPARATUS FOR SAME

This application is a 35 use § 371 national stage entry of international application no. PCT/KR2017/000784 filed on Jan. 23, 2017, and claims priority to U.S. provisional application Nos. 62/281,187 filed on Jan. 21, 2016 and 62/294,299 filed on Feb. 11, 2016, all of which are hereby incorporated by reference in their entireties as if fully set forth herein.

TECHNICAL FIELD

The following description relates to a wireless communication system, and more particularly, to a method and apparatus for transmitting/receiving a V2X message via an LTE Uu interface in a local network.

BACKGROUND ART

Wireless communication systems have been widely deployed to provide various types of communication services such as voice or data. In general, a wireless communication system is a multiple access system that supports communication of multiple users by sharing available system resources (a bandwidth, transmission power, etc.) among them. For example, multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multi-carrier frequency division multiple access (MC-FDMA) system.

Device-to-device (D2D) communication refers to a communication scheme in which a direct link is established between user equipments (UEs), and voice and data are directly transmitted and received between the UEs without intervention of an evolved Node B (eNB). D2D communication may include UE-to-UE communication and peer-to-peer communication. Further, D2D communication may be applied to machine-to-machine (M2M) communication, and machine type communication (MTC).

D2D communication is considered as a solution to reduce the burden of an eNB, caused by rapidly increasing data traffic. For example, since data is transmitted and received between devices without intervention of an eNB in D2D communication, unlike a legacy wireless communication system, the overhead of the network can be reduced. In addition, it may be expected that the introduction of D2D communication will bring about the effects of simplified procedures in an eNB, reduction of the power consumption of devices participating in D2D communication, increased data rates, increased accommodation capability of a network, load distribution, and extension of cell coverage.

At present, vehicle to everything (V2X) communication is under discussion in conjunction with D2D communication. V2X communication conceptually covers vehicle-to-vehicle (V2V) communication between vehicle terminals, vehicle-to-pedestrian (V2P) communication between a vehicle and another type of terminal, and vehicle to infrastructure (V2I) communication between a vehicle and a roadside unit (RSU).

DISCLOSURE

Technical Problem

An aspect of the present disclosure is to provide a method for ensuring service continuity in V2X message transmission and reception via an LTE Uu interface in a local network.

It will be appreciated by persons skilled in the art that the objects that could be achieved with the present disclosure are not limited to what has been particularly described hereinabove and the above and other objects that the present disclosure could achieve will be more clearly understood from the following detailed description.

Technical Solution

According to an embodiment of the present disclosure, a method for transmitting and receiving a vehicle to everything (V2X) message by a user equipment (UE) in a wireless communication system includes transmitting and receiving a V2X message via a long term evolution (LTE) Uu interface of a first local network, receiving local network boundary-related information from a first base station (BS) of the first local network, and determining to perform one or more of V2X message transmission or V2X message reception via a PC5 interface during a selected IP traffic offload at local network (SIPTO) period on the basis of the local network boundary-related information.

According to an embodiment of the present disclosure, a user equipment (UE) for transmitting and receiving a vehicle to everything (V2X) message in a wireless communication system includes a transceiver, and a processor. The processor is configured to transmit and receive a V2X message through the transceiver via a long term evolution (LTE) Uu interface of a first local network, to receive local network boundary-related information from a first base station (BS) of the first local network through the transceiver, and to determine to perform one or more of V2X message transmission or V2X message reception via a PC5 interface during a selected IP traffic offload at local network (SIPTO) period on the basis of the local network boundary-related information.

If it is determined to perform one or more of V2X message transmission or V2X message reception via the PC5 interface, one or more of V2X message transmission to a road side unit (RSU) or V2X message reception from an RSU may be performed.

The UE may re-configure a PDN connection with the first local network as a PDN connection with a second local network, during the SIPTO period.

The local network boundary-related information may include one or more of information indicating that a BS is at a local network boundary, information indicating that a local network is changed, information indicating that a cell is at the local network boundary, information indicating the presence of an RSU at the local network boundary, ID information about the RSU, or information about a time of conducting direct communication with the RSU.

If the UE does not receive the local network boundary-related information any longer, the UE may determine to transmit or receive a V2X message via an LTE Uu interface.

If the SIPTO period has elapsed, the UE may determine to transmit or receive a V2X message via an LTE Uu interface.

If the UE receives one or more of information indicating that a BS is not at a local network boundary, information indicating that a local network is not changed, information indicating that a cell is not at the local network boundary, or information indicating the absence of an RSU, the UE may determine to transmit or receive a V2X message via an LTE Uu interface.

The SIPTO period may be one of a time corresponding to time information about direct communication with an RSU, a time from the reception of the local network boundary-related information to no longer reception of the local network boundary-related information, and a time from the reception of the local network boundary-related information to reception of one or more of information indicating that a BS is not at a local network boundary, information indicating that a local network is not changed, information indicating that a cell is not at the local network boundary, or information indicating the absence of an RSU.

V2X message transmission or V2X message reception via the PC5 interface may be determined according to a type of the UE, a type of a V2X message, or a priority level of the V2X message.

The RSU may be fixed between the first local network and the second local network.

When the UE transmits the V2X message to the RSU, the UE may set a message destination to a Layer-2 ID indicating the RSU.

The UE may omit a one-to-one link setup procedure with the RSU.

Advantageous Effects

According to the present disclosure, despite a change of a local network, service continuity can be ensured in V2X communication.

It will be appreciated by persons skilled in the art that the effects that can be achieved with the present disclosure are not limited to what has been particularly described hereinabove and other advantages of the present disclosure will be more clearly understood from the following detailed description taken in conjunction with the accompanying drawings.

BRIEF DESCRIPTION OF THE DRAWINGS

The accompanying drawings, which are included to provide a further understanding of the disclosure and are incorporated in and constitute a part of this application, illustrate embodiments of the disclosure and together with the description serve to explain the principle of the disclosure. In the drawings.

BEST MODE FOR CARRYING OUT THE INVENTION

Figure 1:
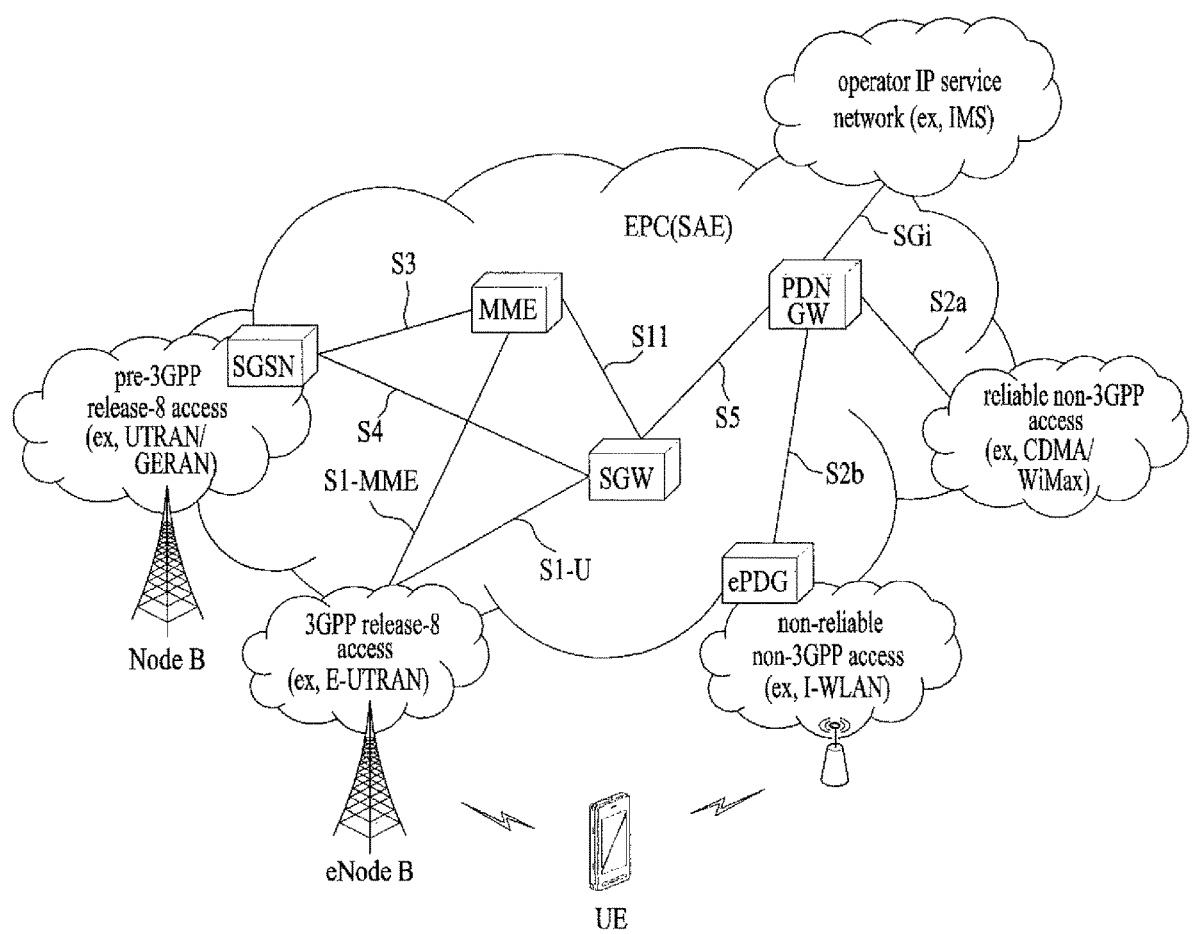
FIG. 1 is a view illustrating a configuration of an evolved packet system (EPS) including an evolved packet core (EPC)

The embodiments below are combinations of components and features of the present invention in a prescribed form. Each component or feature may be considered as selective unless explicitly mentioned as otherwise. Each component or feature may be executed in a form that is not combined with other components and features. Further, some components and/or features may be combined to configure an embodiment of the present invention. The order of operations described in the embodiments of the present invention may be changed. Some components or features of an embodiment may be included in another embodiment or may be substituted with a corresponding component or feature of the present invention.

Specific terms used in the description below are provided to help an understanding of the present invention, and the use of such specific terms may be changed to another form within the scope of the technical concept of the present invention.

In some cases, in order to avoid obscurity of the concept of the present invention, a known structure and apparatus may be omitted, or a block diagram centering on core functions of each structure or apparatus may be used. Moreover, the same reference numerals are used for the same components throughout the present specification.

The embodiments of the present invention may be supported by standard documents disclosed with respect to at least one of IEEE (Institute of Electrical and Electronics Engineers) 802 group system, 3GPP system, 3GPP LTE & LTE-A system and 3GPP2 system. Namely, the steps or portions having not been described in order to clarify the technical concept of the present invention in the embodiments of the present invention may be supported by the above documents. Furthermore, all terms disclosed in the present document may be described according to the above standard documents.

The technology below may be used for various wireless communication systems. For clarity, the description below centers on 3GPP LTE and 3GPP LTE-A, by which the technical idea of the present invention is non-limited.

Terms used in the present document are defined as follows.

UMTS (Universal Mobile Telecommunications System): a GSM (Global System for Mobile Communication) based third generation mobile communication technology developed by the 3GPP.

EPS (Evolved Packet System): a network system that includes an EPC (Evolved Packet Core) which is an IP (Internet Protocol) based packet switched core network and an access network such as LTE and UTRAN. This system is the network of an evolved version of the UMTS.

NodeB: a base station of GERAN/UTRAN. This base station is installed outdoor and its coverage has a scale of a macro cell.

eNodeB: a base station of LTE. This base station is installed outdoor and its coverage has a scale of a macro cell.

UE (User Equipment): the UE may be referred to as terminal, ME (Mobile Equipment), MS (Mobile Station), etc. Also, the UE may be a portable device such as a notebook computer, a cellular phone, a PDA (Personal Digital Assistant), a smart phone, and a multimedia device. Alternatively, the UE may be a non-portable device such as a PC (Personal Computer) and a vehicle mounted device. The term "UE", as used in relation to MTC, can refer to an MTC device.

HNB (Home NodeB): a base station of UMTS network. This base station is installed indoor and its coverage has a scale of a micro cell.

HeNB (Home eNodeB): a base station of an EPS network. This base station is installed indoor and its coverage has a scale of a micro cell.

MME (Mobility Management Entity): a network node of an EPS network, which performs mobility management (MM) and session management (SM).

PDN-GW (Packet Data Network-Gateway)/PGW: a network node of an EPS network, which performs UE IP address allocation, packet screening and filtering, charging data collection, etc.

SGW (Serving Gateway): a network node of an EPS network, which performs mobility anchor, packet routing, idle-mode packet buffering, and triggering of an MME's UE paging.

NAS (Non-Access Stratum): an upper stratum of a control plane between a UE and an MME. This is a functional layer for transmitting and receiving a signaling and traffic message between a UE and a core network in an LTE/UMTS protocol stack, and supports mobility of a UE, and supports a session management procedure of establishing and maintaining IP connection between a UE and a PDN GW.

PDN (Packet Data Network): a network in which a server supporting a specific service (e.g., a Multimedia Messaging Service (MMS) server, a Wireless Application Protocol (WAP) server, etc.) is located.

PDN connection: a logical connection between a UE and a PDN, represented as one IP address (one IPv4 address and/or one IPv6 prefix).

RAN (Radio Access Network): a unit including a Node B, an eNode B, and a Radio Network Controller (RNC) for controlling the Node B and the eNode B in a 3GPP network, which is present between UEs and provides a connection to a core network.

HLR (Home Location Register)/HSS (Home Subscriber Server): a database having subscriber information in a 3GPP network. The HSS can perform functions such as configuration storage, identity management, and user state storage.

PLMN (Public Land Mobile Network): a network configured for the purpose of providing mobile communication services to individuals. This network can be configured per operator.

Proximity Services (or ProSe Service or Proximity-based Service): a service that enables discovery between physically proximate devices, and mutual direct communication/communication through a base station/communication through the third party. At this time, user plane data are exchanged EPC (Evolved Packet Core)

EPC (Evolved Packet Core)

FIG. 1 is a schematic diagram showing the structure of an evolved packet system (EPS) including an evolved packet core (EPC).

The EPC is a core element of system architecture evolution (SAE) for improving performance of 3GPP technology. SAE corresponds to a research project for determining a network structure supporting mobility between various types of networks. For example, SAE aims to provide an optimized packet-based system for supporting various radio access technologies and providing an enhanced data transmission capability.

Specifically, the EPC is a core network of an IP mobile communication system for 3GPP LTE and can support real-time and non-real-time packet-based services. In conventional mobile communication systems (i.e. second-generation or third-generation mobile communication systems), functions of a core network are implemented through a circuit-switched (CS) sub-domain for voice and a packet-switched (PS) sub-domain for data. However, in a 3GPP LTE system which is evolved from the third generation communication system, CS and PS sub-domains are unified into one IP domain. That is, In 3GPP LTE, connection of terminals having IP capability can be established through an IP-based business station (e.g., an eNodeB (evolved Node B)), EPC, and an application domain (e.g., IMS). That is, the EPC is an essential structure for end-to-end IP services.

The EPC may include various components. FIG. 1 shows some of the components, namely, a serving gateway (SGW), a packet data network gateway (PDN GW), a mobility management entity (MME), a serving GPRS (general packet radio service) supporting node (SGSN) and an enhanced packet data gateway (ePDG).

The SGW operates as a boundary point between a radio access network (RAN) and a core network and maintains a data path between an eNodeB and the PDN GW. When. When a terminal moves over an area served by an eNodeB, the SGW functions as a local mobility anchor point. That is, packets. That is, packets may be routed through the SGW for mobility in an evolved UMTS terrestrial radio access network (E-UTRAN) defined after 3GPP release-8. In addition, the SGW may serve as an anchor point for mobility of another 3GPP network (a RAN defined before 3GPP release-8, e.g., UTRAN or GERAN (global system for mobile communication (GSM)/enhanced data rates for global evolution (EDGE) radio access network).

The PDN GW corresponds to a termination point of a data interface for a packet data network. The PDN GW may support policy enforcement features, packet filtering and charging support. In addition, the PDN GW may serve as an anchor point for mobility management with a 3GPP network and a non-3GPP network (e.g., an unreliable network such as an interworking wireless local area network (I-WLAN) and a reliable network such as a code division multiple access (CDMA) or WiMax network).

Although the SGW and the PDN GW are configured as separate gateways in the example of the network structure of FIG. 1, the two gateways may be implemented according to a single gateway configuration option.

The MME performs signaling and control functions for supporting access of a UE for network connection, network resource allocation, tracking, paging, roaming and handover. The MME controls control plane functions associated with subscriber and session management. The MME manages numerous eNodeBs and signaling for selection of a conventional gateway for handover to other 2G/3G networks. In addition, the MME performs security procedures, terminal-to-network session handling, idle terminal location management, etc.

The SGSN handles all packet data such as mobility management and authentication of a user for other 3GPP networks (e.g., a GPRS network).

The ePDG serves as a security node for a non-3GPP network (e.g., an I-WLAN, a Wi-Fi hotspot, etc.).

As described above with reference to FIG. 1, a terminal having IP capabilities may access an IP service network (e.g., an IMS) provided by an operator via various elements in the EPC not only based on 3GPP access but also based on non-3GPP access.

Additionally, FIG. 1 shows various reference points (e.g. S1-U, S1-MME, etc.). In 3GPP, a conceptual link connecting two functions of different functional entities of an E-UTRAN and an EPC is defined as a reference point. Table 1 is a list of the reference points shown in FIG. 1. Various reference points may be present in addition to the reference points in Table 1 according to network structures.

TABLE I

| Reference point | Description |
|---|---|
| S1-MME | Reference point for the control plane protocol between E-UTRAN and MME |
| S1-U | Reference point between E-UTRAN and Serving GW for the per bearer user plane tunneling and inter eNodeB path switching during handover |
| S3 | It enables user and bearer information exchange for inter 3GPP access network mobility in idle and/or active state. This reference point can be used intra-PLMN or inter-PLMN (e.g. in the case of Inter-PLMN HO). |
| S4 | It provides related control and mobility support between GPRS Core and the 3GPP Anchor function of Serving GW. In addition, if Direct Tunnel is not established, it provides the user plane tunneling. |
| S5 | It provides user plane tunneling and tunnel management between Serving GW and PDN GW. It is used for Serving GW relocation due to UE mobility and if the Serving GW needs to connect to a non-collocated PDN GW for the required PDN connectivity. |
| S11 | Reference point between an MME and an SGW |
| SGi | It is the reference point between the PDN GW and the packet data network. Packet data network may be an operator external public or private packet data network or an intra operator packet data network, e.g. for provision of IMS services. This reference point corresponds to Gi for 3GPP accesses. |

Among the reference points shown in FIG. 1, S2a and S2b correspond to non-3GPP interfaces. S2a is a reference point which provides reliable non-3GPP access and related control and mobility support between PDN GWs to a user plane. S2b is a reference point which provides related control and mobility support between the ePDG and the PDN GW to the user plane.

Figure 2:
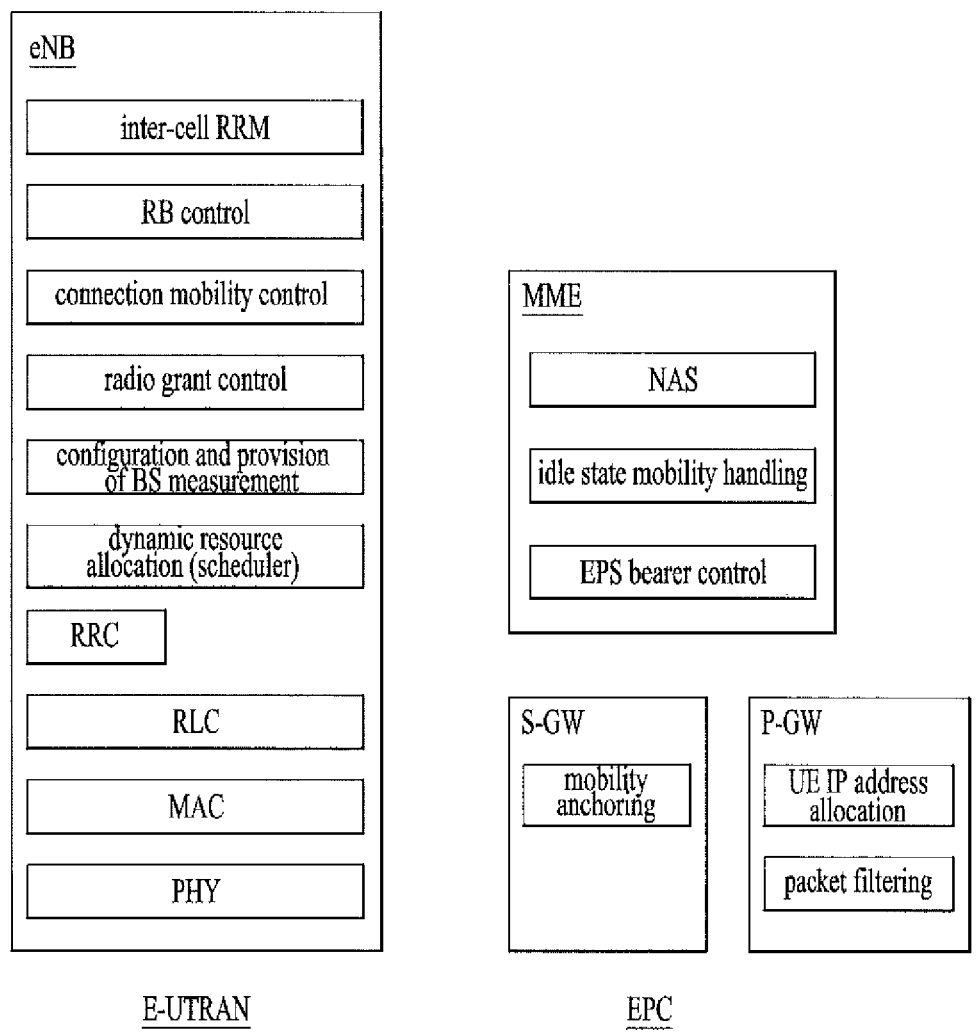
FIG. 2 is an exemplary view illustrating the architecture of a general E-UTRAN and EPC.

FIG. 2 is a diagram exemplarily illustrating architectures of a typical E-UTRAN and EPC.

As shown in the figure, while radio resource control (RRC) connection is activated, an eNodeB may perform routing to a gateway, scheduling transmission of a paging message, scheduling and transmission of a broadcast channel (BCH), dynamic allocation of resources to a UE on uplink and downlink, configuration and provision of eNodeB measurement, radio bearer control, radio admission control, and connection mobility control. In the EPC, paging generation, LTE_IDLE state management, ciphering of the user plane, SAE bearer control, and ciphering and integrity protection of NAS signaling.

Figure 3:
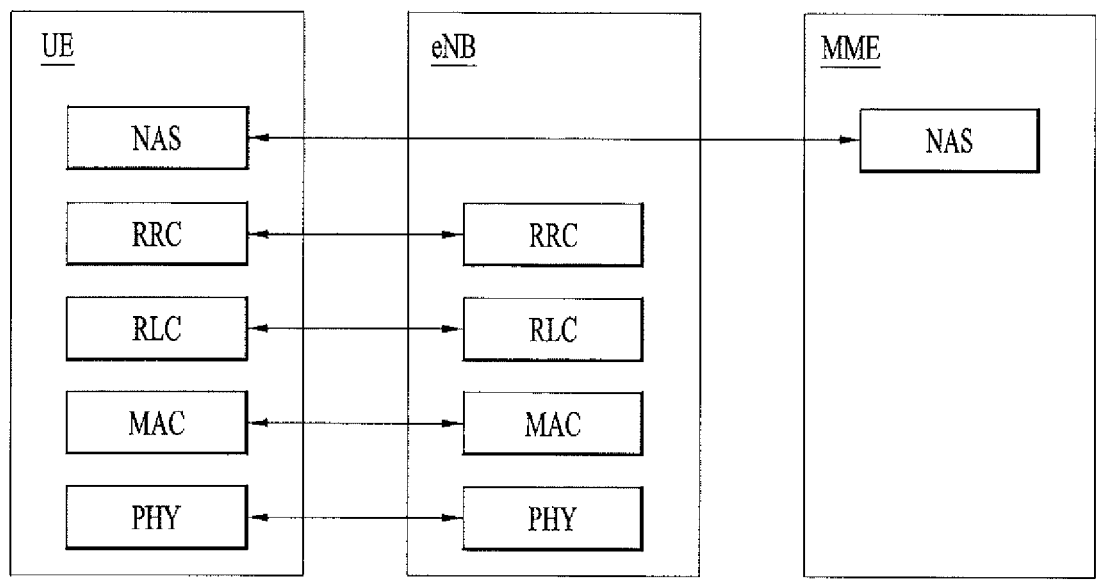
FIG. 3 is an exemplary view illustrating the architecture of radio interface protocols on a control plane.
Figure 4:
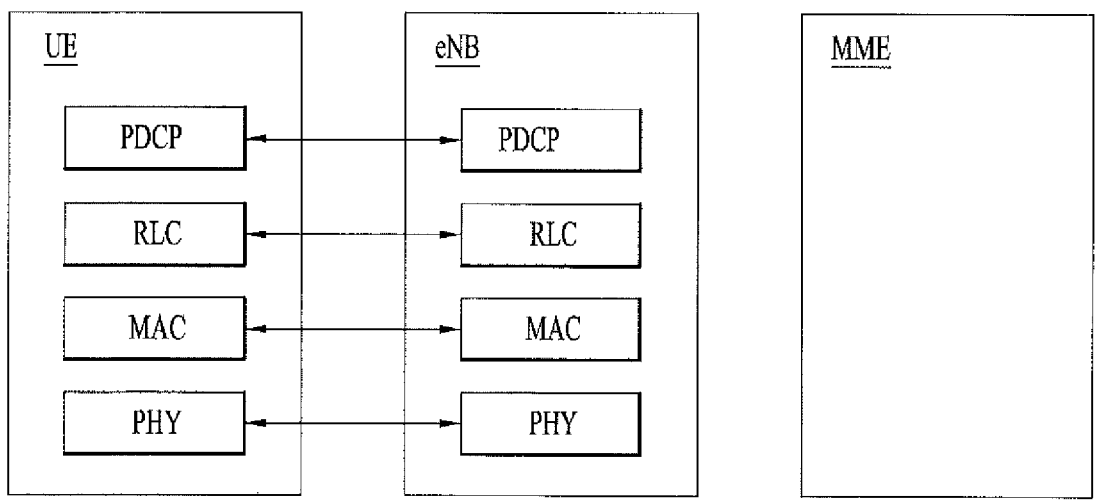
FIG. 4 is an exemplary view illustrating the architecture of radio interface protocols on a user plane.

FIG. 3 is a diagram exemplarily illustrating the structure of a radio interface protocol in a control plane between a UE and a base station, and FIG. 4 is a diagram exemplarily illustrating the structure of a radio interface protocol in a user plane between the UE and the base station.

The radio interface protocol is based on the 3GPP wireless access network standard. The radio interface protocol horizontally includes a physical layer, a data link layer, and a networking layer. The radio interface protocol is divided into a user plane for transmission of data information and a control plane for delivering control signaling which are arranged vertically.

The protocol layers may be classified into a first layer (L1), a second layer (L2), and a third layer (L3) based on the three sublayers of the open system interconnection (OSI) model that is well known in the communication system.

Hereinafter, description will be given of a radio protocol in the control plane shown in FIG. 3 and a radio protocol in the user plane shown in FIG. 4.

The physical layer, which is the first layer, provides an information transfer service using a physical channel. The physical channel layer is connected to a medium access control (MAC) layer, which is a higher layer of the physical layer, through a transport channel Data is transferred between the physical layer and the MAC layer through the transport channel Transfer of data between different physical layers, i.e., a physical layer of a transmitter and a physical layer of a receiver is performed through the physical channel.

The physical channel consists of a plurality of subframes in the time domain and a plurality of subcarriers in the frequency domain. One subframe consists of a plurality of symbols in the time domain and a plurality of subcarriers. One subframe consists of a plurality of resource blocks. One resource block consists of a plurality of symbols and a plurality of subcarriers. A Transmission Time Interval (TTI), a unit time for data transmission, is 1 ms, which corresponds to one subframe.

According to 3GPP LTE, the physical channels present in the physical layers of the transmitter and the receiver may be divided into data channels corresponding to Physical Downlink Shared Channel (PDSCH) and Physical Uplink Shared Channel (PUSCH) and control channels corresponding to Physical Downlink Control Channel (PDCCH), Physical Control Format Indicator Channel (PCFICH), Physical Hybrid-ARQ Indicator Channel (PHICH) and Physical Uplink Control Channel (PUCCH).

The second layer includes various layers.

First, the MAC layer in the second layer serves to map various logical channels to various transport channels and also serves to map various logical channels to one transport channel. The MAC layer is connected with an RLC layer, which is a higher layer, through a logical channel. The logical channel is broadly divided into a control channel for transmission of information of the control plane and a traffic channel for transmission of information of the user plane according to the types of transmitted information.

The radio link control (RLC) layer in the second layer serves to segment and concatenate data received from a higher layer to adjust the size of data such that the size is suitable for a lower layer to transmit the data in a radio interval.

The Packet Data Convergence Protocol (PDCP) layer in the second layer performs a header compression function of reducing the size of an IP packet header which has a relatively large size and contains unnecessary control information, in order to efficiently transmit an IP packet such as an IPv4 or IPv6 packet in a radio interval having a narrow bandwidth. In addition, in LTE, the PDCP layer also performs a security function, which consists of ciphering for preventing a third party from monitoring data and integrity protection for preventing data manipulation by a third party.

The Radio Resource Control (RRC) layer, which is located at the uppermost part of the third layer, is defined only in the control plane, and serves to configure radio bearers (RBs) and control a logical channel, a transport channel, and a physical channel in relation to reconfiguration and release operations. The RB represents a service provided by the second layer to ensure data transfer between a UE and the E-UTRAN.

If an RRC connection is established between the RRC layer of the UE and the RRC layer of a wireless network, the UE is in the RRC Connected mode. Otherwise, the UE is in the RRC Idle mode.

Hereinafter, description will be given of the RRC state of the UE and an RRC connection method. The RRC state refers to a state in which the RRC of the UE is or is not logically connected with the RRC of the E-UTRAN. The RRC state of the UE having logical connection with the RRC of the E-UTRAN is referred to as an RRC_CONNECTED state. The RRC state of the UE which does not have logical connection with the RRC of the E-UTRAN is referred to as an RRC_IDLE state. A UE in the RRC_CONNECTED state has RRC connection, and thus the E-UTRAN may recognize presence of the UE in a cell unit. Accordingly, the UE may be efficiently controlled. On the other hand, the E-UTRAN cannot recognize presence of a UE which is in the RRC_IDLE state. The UE in the RRC_IDLE state is managed by a core network in a tracking area (TA) which is an area unit larger than the cell. That is, for the UE in the RRC_IDLE state, only presence or absence of the UE is recognized in an area unit larger than the cell. In order for the UE in the RRC_IDLE state to be provided with a usual mobile communication service such as a voice service and a data service, the UE should transition to the RRC_CONNECTED state. A TA is distinguished from another TA by a tracking area identity (TAI) thereof. A UE may configure the TAI through a tracking area code (TAC), which is information broadcast in a cell.

When the user initially turns on the UE, the UE searches for a proper cell first. Then, the UE establishes RRC connection in the cell and registers information thereabout in the core network. Thereafter, the UE stays in the RRC_IDLE state. When necessary, the UE staying in the RRC_IDLE state selects a cell (again) and checks system information or paging information. This operation is called camping on a cell. Only when the UE staying in the RRC_IDLE state needs to establish RRC connection, does the UE establish RRC connection with the RRC layer of the E-UTRAN through the RRC connection procedure and transition to the RRC_CONNECTED state. The UE staying in the RRC_IDLE state needs to establish RRC connection in many cases. For example, the cases may include an attempt of a user to make a phone call, an attempt to transmit data, or transmission of a response message after reception of a paging message from the E-UTRAN.

The non-access stratum (NAS) layer positioned over the RRC layer performs functions such as session management and mobility management.

Hereinafter, the NAS layer shown in FIG. 3 will be described in detail.

The eSM (evolved Session Management) belonging to the NAS layer performs functions such as default bearer management and dedicated bearer management to control a UE to use a PS service from a network. The UE is assigned a default bearer resource by a specific packet data network (PDN) when the UE initially accesses the PDN. In this case, the network allocates an available IP to the UE to allow the UE to use a data service. The network also allocates QoS of a default bearer to the UE. LTE supports two kinds of bearers. One bearer is a bearer having characteristics of guaranteed bit rate (GBR) QoS for guaranteeing a specific bandwidth for transmission and reception of data, and the other bearer is a non-GBR bearer which has characteristics of best effort QoS without guaranteeing a bandwidth. The default bearer is assigned to a non-GBR bearer. The dedicated bearer may be assigned a bearer having QoS characteristics of GBR or non-GBR.

A bearer allocated to the UE by the network is referred to as an evolved packet service (EPS) bearer. When the EPS bearer is allocated to the UE, the network assigns one ID. This ID is called an EPS bearer ID. One EPS bearer has QoS characteristics of a maximum bit rate (MBR) and/or a guaranteed bit rate (GBR).

Figure 5:
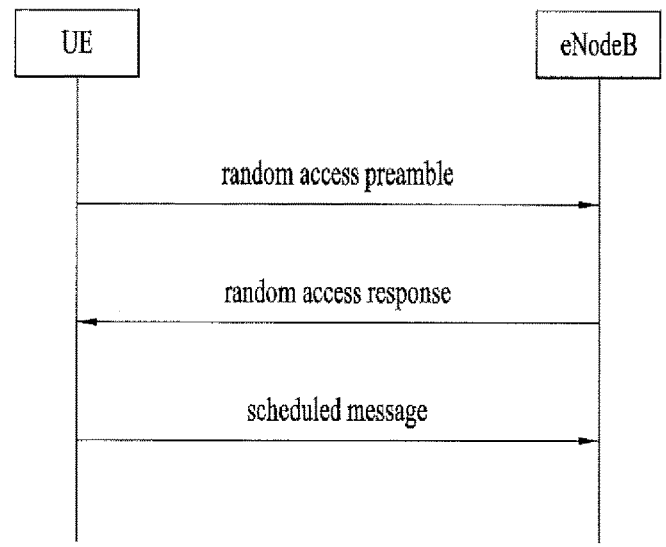
FIG. 5 is a flowchart illustrating a random access procedure.

FIG. 5 is a flowchart illustrating a random access procedure in 3GPP LTE.

The random access procedure is used for a UE to obtain UL synchronization with an eNB or to be assigned a UL radio resource.

The UE receives a root index and a physical random access channel (PRACH) configuration index from an eNodeB. Each cell has 64 candidate random access preambles defined by a Zadoff-Chu (ZC) sequence. The root index is a logical index used for the UE to generate 64 candidate random access preambles.

Transmission of a random access preamble is limited to a specific time and frequency resources for each cell. The PRACH configuration index indicates a specific subframe and preamble format in which transmission of the random access preamble is possible.

The UE transmits a randomly selected random access preamble to the eNodeB. The UE selects a random access preamble from among 64 candidate random access preambles and the UE selects a subframe corresponding to the PRACH configuration index. The UE transmits the selected random access preamble in the selected subframe.

Upon receiving the random access preamble, the eNodeB sends a random access response (RAR) to the UE. The RAR is detected in two steps. First, the UE detects a PDCCH masked with a random access (RA)-RNTI. The UE receives an RAR in a MAC (medium access control) PDU (protocol data unit) on a PDSCH indicated by the detected PDCCH.

Figure 6:
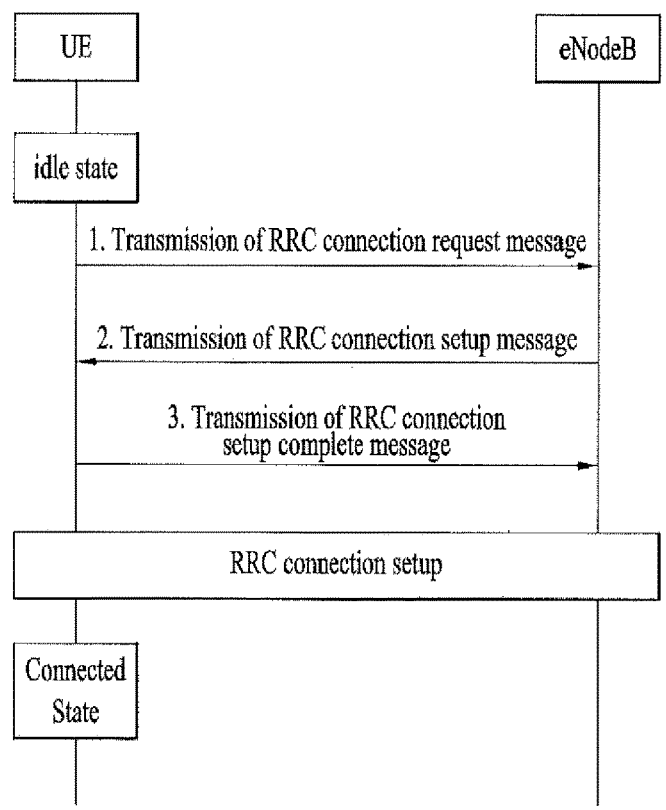
FIG. 6 is a view illustrating a connection procedure in a radio resource control (RRC) layer.

FIG. 6 illustrates a connection procedure in a radio resource control (RRC) layer.

As shown in FIG. 6, the RRC state is set according to whether or not RRC connection is established. An RRC state indicates whether or not an entity of the RRC layer of a UE has logical connection with an entity of the RRC layer of an eNodeB. An RRC state in which the entity of the RRC layer of the UE is logically connected with the entity of the RRC layer of the eNodeB is called an RRC connected state. An RRC state in which the entity of the RRC layer of the UE is not logically connected with the entity of the RRC layer of the eNodeB is called an RRC idle state.

A UE in the Connected state has RRC connection, and thus the E-UTRAN may recognize presence of the UE in a cell unit. Accordingly, the UE may be efficiently controlled. On the other hand, the E-UTRAN cannot recognize presence of a UE which is in the idle state. The UE in the idle state is managed by the core network in a tracking area unit which is an area unit larger than the cell. The tracking area is a unit of a set of cells. That is, for the UE which is in the idle state, only presence or absence of the UE is recognized in a larger area unit. In order for the UE in the idle state to be provided with a usual mobile communication service such as a voice service and a data service, the UE should transition to the connected state.

When the user initially turns on the UE, the UE searches for a proper cell first, and then stays in the idle state. Only when the UE staying in the idle state needs to establish RRC connection, the UE establishes RRC connection with the RRC layer of the eNodeB through the RRC connection procedure and then performs transition to the RRC connected state.

The UE staying in the idle state needs to establish RRC connection in many cases. For example, the cases may include an attempt of a user to make a phone call, an attempt to transmit data, or transmission of a response message after reception of a paging message from the E-UTRAN.

In order for the UE in the idle state to establish RRC connection with the eNodeB, the RRC connection procedure needs to be performed as described above. The RRC connection procedure is broadly divided into transmission of an RRC connection request message from the UE to the eNodeB, transmission of an RRC connection setup message from the eNodeB to the UE, and transmission of an RRC connection setup complete message from the UE to eNodeB, which are described in detail below with reference to FIG. 6.

1) When the UE in the idle state desires to establish RRC connection for reasons such as an attempt to make a call, a data transmission attempt, or a response of the eNodeB to paging, the UE transmits an RRC connection request message to the eNodeB first.

2) Upon receiving the RRC connection request message from the UE, the ENB accepts the RRC connection request of the UE when the radio resources are sufficient, and then transmits an RRC connection setup message, which is a response message, to the UE.

3) Upon receiving the RRC connection setup message, the UE transmits an RRC connection setup complete message to the eNodeB. Only when the UE successfully transmits the RRC connection setup message, does the UE establish RRC connection with the eNode B and transition to the RRC connected mode.

Figure 7:
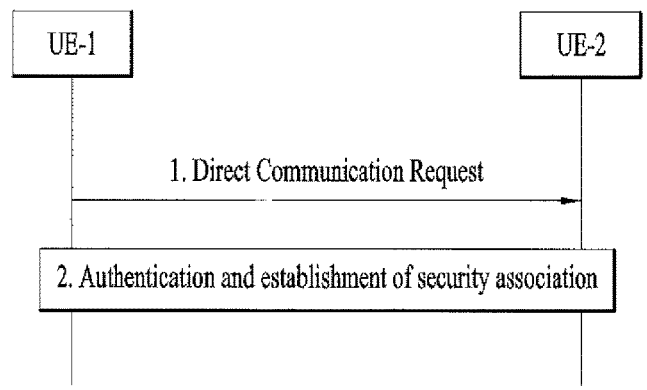
FIG. 7 is a view illustrating a procedure for establishing a one-to-one connection between UEs.

FIG. 7 illustrates a procedure for establishing a one-to-one connection between UEs. Once a UE establishes a one-to-one connection in the procedure illustrated in FIG. 7, the UE may transmit and receive a V2X message via a PC5 interface (a D2D interface or a sidelink at the physical layer). For more details of the procedure, refer to section 5.4.5.2 (Establishment of secure layer-2 link over PC5) of TS 23.303. V2X message transmission and reception via this one-to-one PC5 interface connection may be performed between a UE and a UE-type RSU as well as between UEs. Further, aside from V2X message transmission and reception via a one-to-one PC5 interface connection, a V2X message may be transmitted and received in a one-to-many manner, that is, in a broadcasting manner. For V2X message transmission and reception in the one-to-many manner, refer to TS 23.285.

Figure 8:
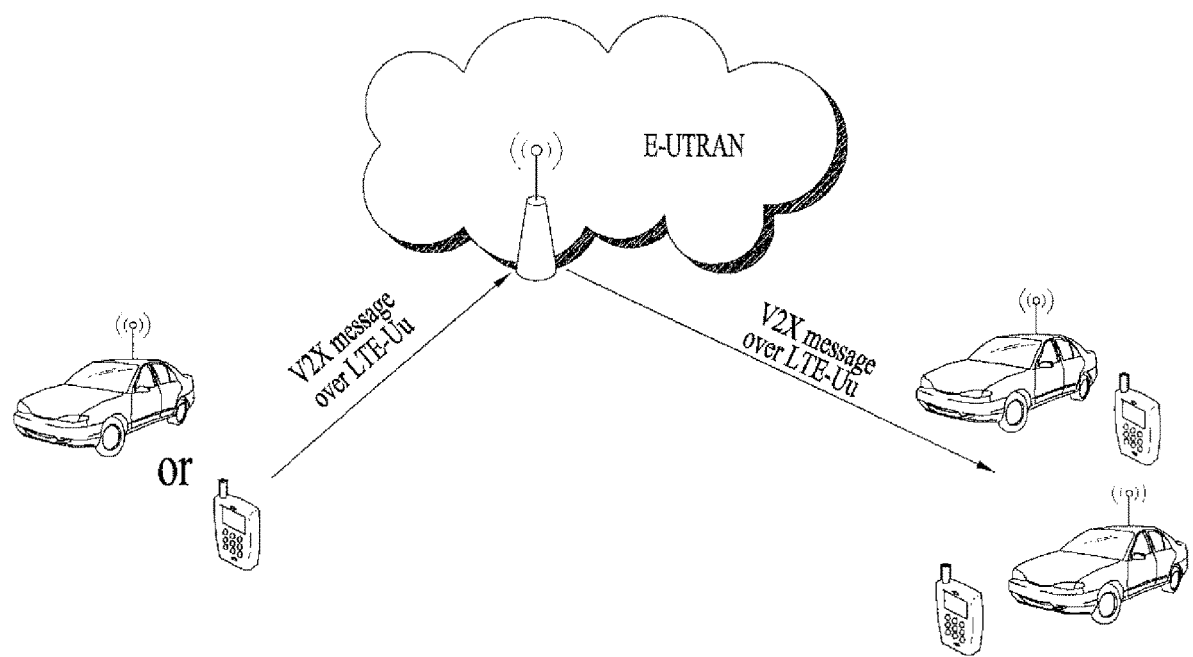
FIG. 8 is an exemplary view illustrating transmission and reception of a V2X message via an LTE Uu interface.
Figure 9:
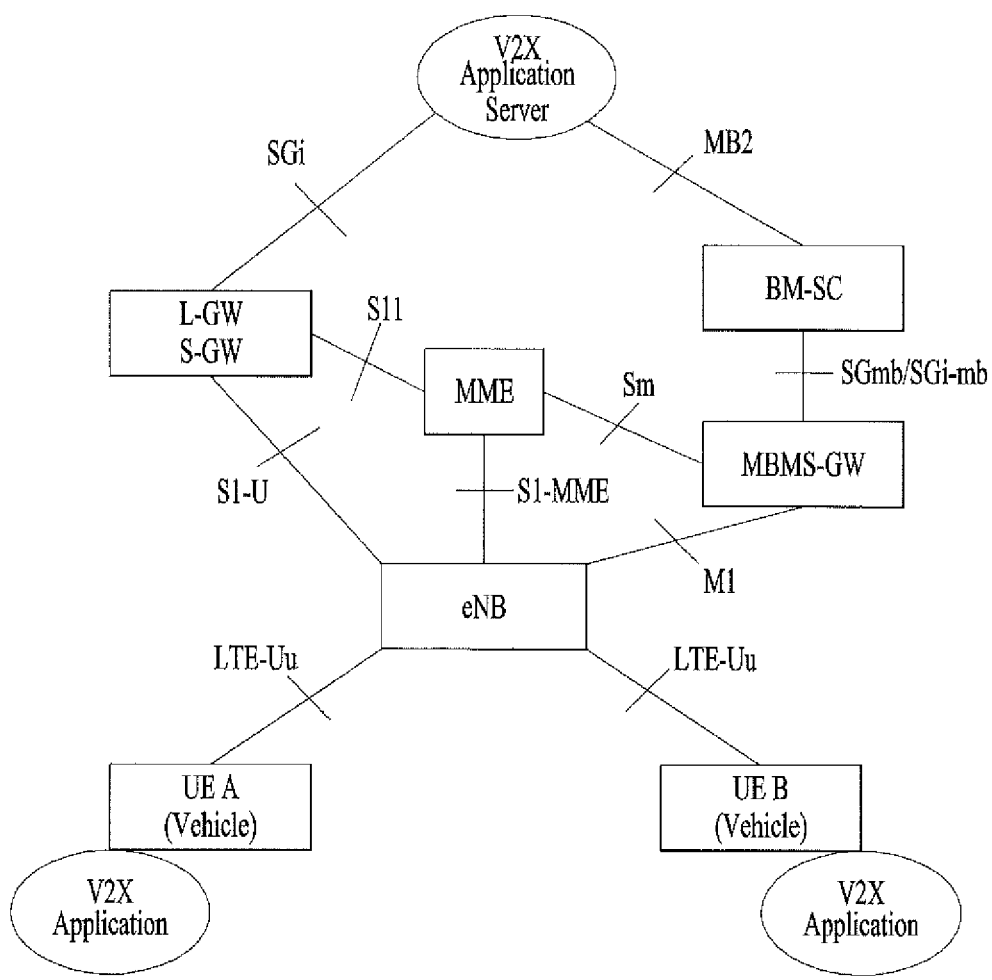
FIG. 9 is a view illustrating the architecture of SIPTO@LN and local MBMS, for local routing of a V2X message.

Further, as a method for transmitting and receiving a V2X message, a LTE-Uu-based V2X message transmission and reception method is available, aside from the method for transmitting and receiving a V2X message via a PC5 interface. FIG. 8 illustrates an example of transmitting and receiving a V2X message via an LTE Uu interface. Referring to FIG. 8, a UE may transmit a V2X message via an LTE-Uu interface, and the V2X message may be transmitted to a plurality of UEs over LTE-Uu. To reduce the delay of V2X message transmission and reception, local routing of a V2X message may be used. To this end, selected IP traffic offload at local network (SIPTO@LN) in 3GPP TS 23.401 may be considered. FIG. 9 is a view illustrating the architecture of SIPTO@LN and local MBMS, for local routing of a V2X message. Referring to FIG. 9, a core network entity and a V2X application server are located near to an access network in order to reduce a delay.

Figure 10:
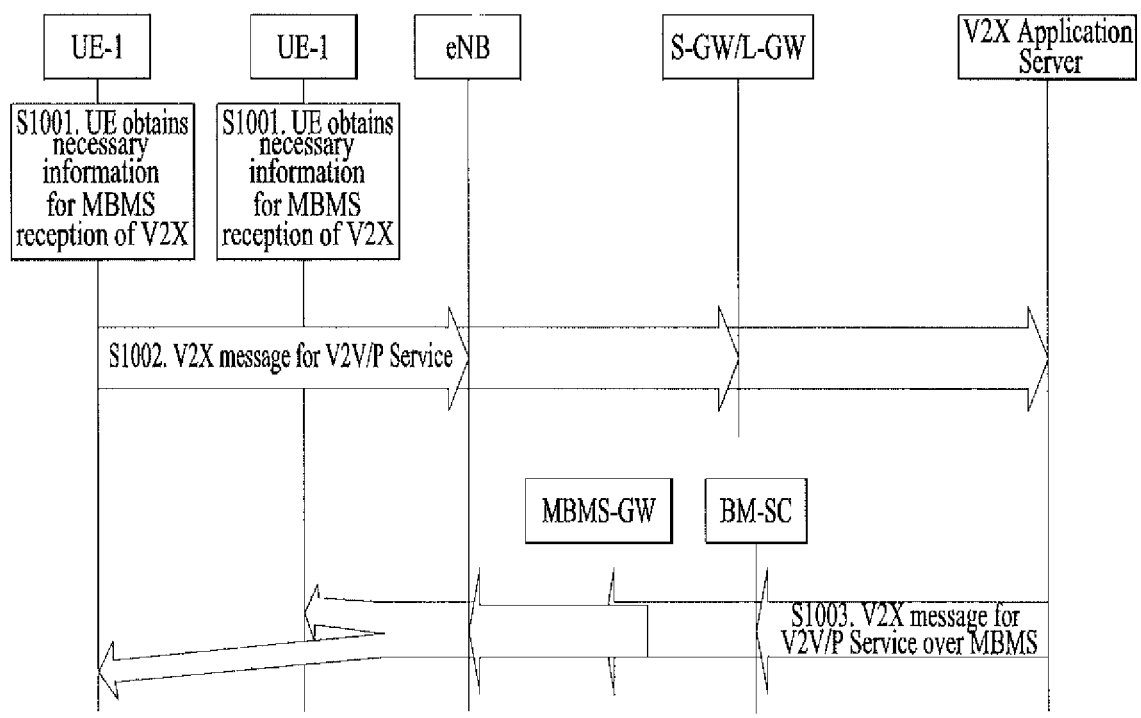
FIG. 10 is a view illustrating a procedure for transmitting and receiving a V2X message via an LTE-Uu interface.

FIG. 10 is a view illustrating a procedure for transmitting and receiving a V2X message via an LTE-Uu interface. Referring to FIG. 10, UEs acquire information required for MBMS reception of a V2X message for V2V/P services in step S1001. In step S1002, UE-1 transmits a V2X message over LTE-Uu. As described in TS 23.401, UE-1 has already established SIPTO in a local network PDN connection to transmit a V2X message for V2V/P service. An eNB receives the V2X message, and the V2X message is routed to a V2X application server through an S-GW/L-GW. In step S1003, the V2X application server determines to forward the V2X message to a target area of the message. The V2X application server transmits the V2X message to the target area of the message by MBMS delivery. An MBMS bearer used for the MBMS delivery may be preconfigured. In the following description, a local network may be interpreted as a local network for V2X service, a local network for local routing of a V2X message, or the like.

Figure 11:
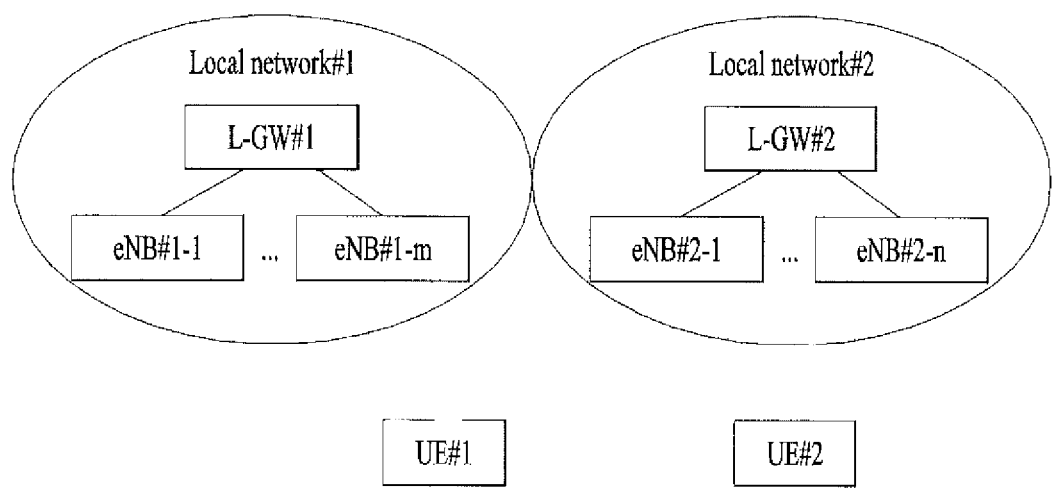
FIG. 11 is a view illustrating an exemplary configuration of a local network for transmitting and receiving a V2X message.

FIG. 11 is a view illustrating an exemplary configuration of a local network for transmitting and receiving a V2X message. In an LTE-Uu-based V2X message transmission method using such a local network, a serving local network is highly likely to be changed during driving of a vehicle, in view of the nature of a fast traveling vehicle. For example, the serving eNB of UE#1 is eNB#1-*m*. If UE#1 moves to eNB#2-1 and receives a service from eNB#2-1 during transmission and reception of a V2X message through local network #1, the local network is changed. That is, a local GW with which a PDN connection has been established is changed, and thus local network #2 should re-generate a PDN connection for unicast transmission. Moreover, MBMS reception from local network #1 is not available any longer. That is, if the local network is changed, the PDN connection needs to be released and a PDN connection should be established with an L-GW of the new local network, for transmission and reception of a V2X message via an LTE Uu interface. In the course of this procedure, a V2X message may not be transmitted and received, thus resulting in a problem with service connectivity, which will be described in detail with reference to FIG. 12.

Figure 12:
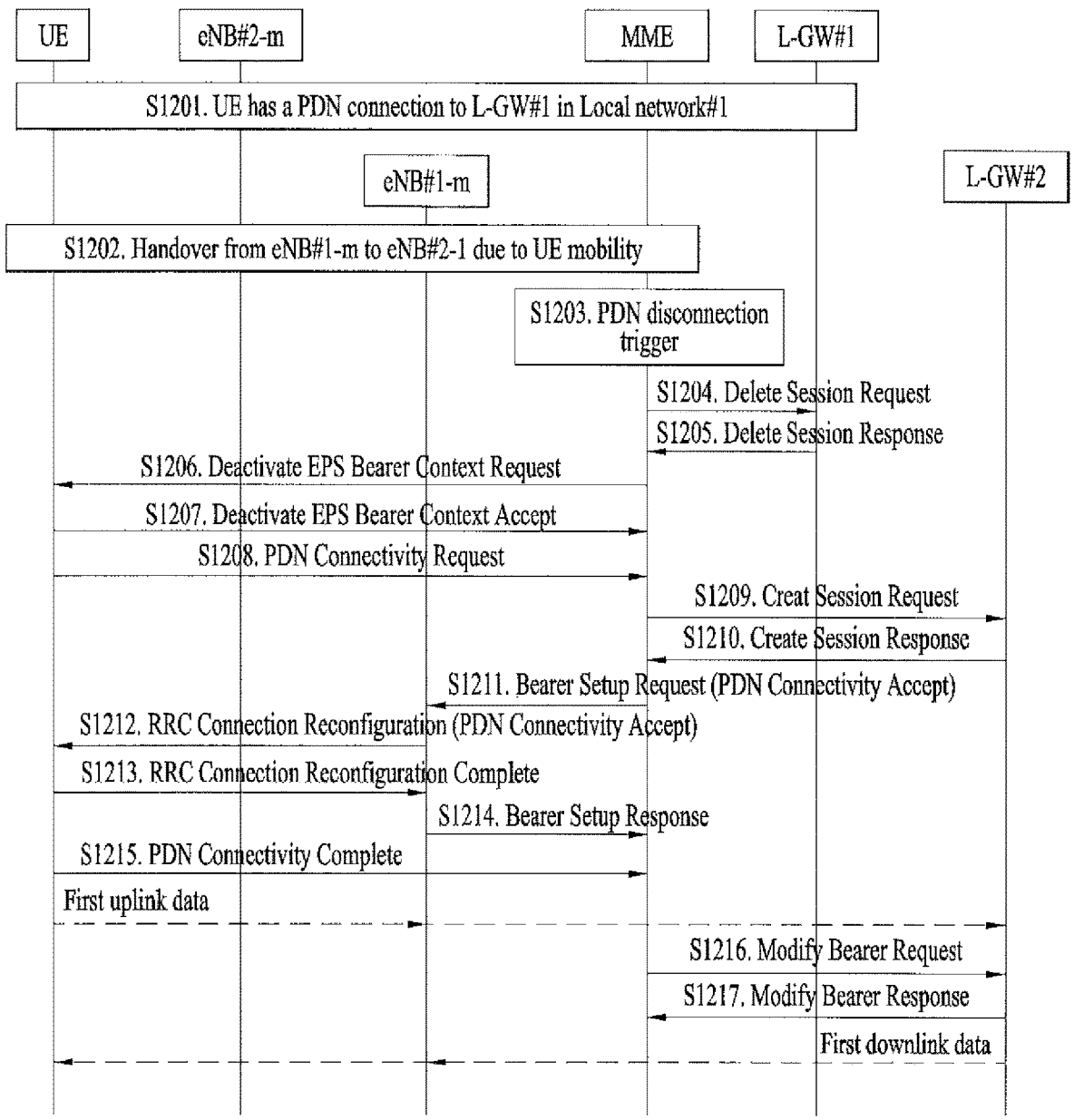
FIG. 12 is a view illustrating a change of a local network caused by movement of a UE, and a related procedure.

FIG. 12 illustrates a procedure for moving from eNB #1-*m* in local network #1 to eNB#2-1 in local network #2 by a UE in the local network scenario illustrated in FIG. 11. As the UE moves from one local network to another local network, a PDN connection that the UE has established with L-GW#1 in the old local network, local network #1 is released. Thus, the UE should re-establish a PDN connection with L-GW#2 in local network #2.

In step S1201, the UE has the PDN connection to L-GW #1 in local network #1. Thus, the UE may transmit a V2X message via the PDN connection. In step S1202, as the UE moves, a handover procedure from eNB#1-*m* belonging to local network#1 to eNB#2-1 belonging to local network#2 is performed. For details of the handover procedure, refer to section 5.5.1 (intra-E-UTRAN handover) in TS 23.401.

In step S1203, an MME recognizes that the source eNB, eNB#1-m and the target eNB, eNB#2-1 belong to different local networks on the basis of information received from the target eNB or a source MME (in the case where the MME is changed) in the handover procedure. As the L-GW is changed, the MME determines to release the PDN connection, considering that the PN connection may not be maintained any longer.

In step S1204, the MME transmits a Delete Session Request message to the GW with which the PDN connection has been established, that is, L-GW#1. L-GW#1 responds with a Delete Session Response message in step S1205. In step S1206, the MME transmits to the UE a Deactivate EPS Bearer Context Request message requesting the UE to release the PDN connection and establish a PDN connection with the same APN. For this purpose, the message includes request for reactivation information. In step S1207, the UE releases all resources related to the PDN connection, and responds to the MME with a Deactivate EPS bearer Context Accept message.

Since the Deactivate EPS bearer Context Request message received from the MME in step S1206 includes information indicating re-establishment of a PDN connection with the same APN as the released PDN connection, the UE transmits to the MME a PDN Connectivity request message to re-establish a PDN connection with the corresponding APN in step S1208. In step S1209, the MME transmits a Create Session Request message to L-GW#2 in order to establish the PDN connection. In step S1210, L-GW#2 responds with a Create Session Response message. In step S1211, the MME transmits a Bearer Setup Request message which includes context information about the PDN connection established with eNB#2-1, and a PDN Connectivity Accept message being a NAS message to be transmitted to the UE. In step S1212, eNB#2-1 transmits to the UE an RRC Connection Reconfiguration message including bearer information about the PDN connection and the PDN Connectivity Accept message. In step S1213, the UE responds to eNB#2-1 with an RRC Connection Reconfiguration Complete message. In step S1214, eNB#2-1 transmits a Bearer Setup Response message to the MME. In step S1215, the UE transmits a PDN Connectivity Complete message to the MME. Then, the UE may transmit uplink data.

In step S1216, the MME transmits a Modify Bearer Request message including information about eNB#2-1 to L-GW#2 in order to enable downlink data transmission to the UE. In step S1217, L-GW#2 responds with a Modify Bearer Response message. Then, L-GW#2 may transmit downlink data to the UE.

In the above procedure, the UE may not transmit a V2X message during a time period between step S1202 and step S1205, that is, until before the PDN connection is established in the target local network. As a result, a problem may occur to service continuity. The problem may become more serious, when the V2X UE moves faster and a network environment is configured, centering on a local network, as is the case with suburbs.

Now, a description will be given of an efficient V2X message transmission and reception method which can overcome the above problem.

Embodiment 1

The UE may receive or transmit a V2X message via an LTE Uu interface of a first local network. That is, the UE is receiving a V2X service over LTE-Uu through the local network. A V2X message may be transmitted (i.e., uplink transmission) in a unicast manner, whereas a V2X message may be received (i.e., downlink transmission) in a unicast, broadcast, or multicast manner. In the broadcast/multicast transmission, the V2X message transmission may be MBMS or SC-PTMC transmission.

The UE may receive local network boundary-related information from a first eNB in the first local network. In this case, the UE may determine to perform one or more of V2X message transmission or V2X message reception via a PC5 interface during an SIPTO period on the basis of the local network boundary-related information. If determining to perform one or more of V2X message transmission or V2X message reception via a PC5 interface, the UE may perform one or more of V2X message transmission to an RSU or V2X message reception from the RSU. Within the SIPTO period, the UE may reconfigure a PDN connection with the first local network as a PDN connection with a second local network. The SIPTO period may be a period during which an L-GW is changed and/or an RSU processes a V2X message, as described before with reference to FIG. 12. Specifically, the SIPTO period may correspond to one of a time corresponding to information about a time of direct communication with an RSU, a time from the reception of the local network boundary-related information to no longer reception of the local network boundary-related information, and a time from the reception of the local network boundary-related information to reception of one or more of information indicating that an eNB is not located at a local network boundary, information indicating that the local network is not changed, information indicating that a cell is not located at the local network boundary, or information indicating the absence of an RSU.

In the above description, the local network boundary-related information may include one or more of information indicating that an eNB is located at the boundary (or edge) of a local network, information indicating that the local network is changed (or will be changed), information indicating that a cell is located at the boundary (or edge) of the local network, information indicating the presence of an RSU (or a UE-type RSU) at the boundary (or edge) of the local network, ID information about the RSU, and information about a time at which direct communication is conducted with the RSU. The ID information about the RSU may include one or more of a Layer-2 ID and an IP address. (The ID information about the RSU may be acquired from the eNB in this manner, and in various manners proposed in the following Embodiment 2). The information about the time at which direct communication is conducted with the RSU may be represented by a starting time and an ending time, and may be provided as period information (a few ms, a few sec, or the like) from the time of acquiring this information. This information may be configured in consideration of a time taken to reconfigure a PDN connection of the UE with a target local network or information indicating a time until which the PDN connection is reconfigured. This information may correspond to the SIPTO period. The above-described information may be acquired from a network node (e.g., MME, V2X Control Function, or the like) other than the eNB, or preconfigured. Particularly, the information indicating the presence of an RSU may be acquired from a UE-type RSU (e.g., the UE-type RSU may announce its existence by a direct discovery message or the like). The local network boundary-related information may be broadcast in an SIB by the eNB, and a handover indication may be provided to the UE in this message by the eNB.

If the UE does not receive the local network boundary-related information any longer, the UE may determine to transmit or receive a V2X message via an LTE Uu interface. Or if the SIPTO period has elapsed, the UE may determine to transmit or receive a V2X message via the LTE Uu interface. Or upon receipt of one or more of the information indicating that the eNB is not located at the boundary of the local network, the information indicating that the local network is not changed, or the information indicating the absence of an RSU, the UE may determine to transmit or receive a V2X message via the LTE Uu interface. The above-described information may be acquired from a network node (e.g., MME, V2X Control Function, or the like) other than the eNB, or preconfigured. Particularly, the information indicating the presence of an RSU may be acquired from a UE-type RSU (e.g., the UE-type RSU may announce its existence by a direct discovery message or the like).

Transmission or reception of a V2X message via a PC5 interface (or simultaneous/overlapped transmission via an LTE Uu interface during transmission or reception of a V2X message via the PC5 interface) may be determined according to a UE type, the type of the V2X message, or the priority level of the V2X message. For example, the UE may determine one transmission/reception method from among the following a) to f) in relation to transmission or reception of a V2X message via the PC5 interface. One of a) to f) may be acquired when the local network boundary-related information is acquired.

a) V2X message transmission and reception over PC5 instead of V2X message transmission and reception over LTE-Uu.

b) V2X message transmission over PC5 instead of V2X message transmission over LTE-Uu. A V2X message is still received over LTE-Uu.

c) V2X message reception over PC5 instead of V2X message reception over LTE-Uu. A V2X message is still transmitted over LTE-Uu.

d) V2X message transmission and reception over PC5 during V2X message transmission and reception over LTE-Uu e) V2X message transmission over PC5 during V2X message transmission over LTE-Uu. A V2X message is received only over LTE-Uu.

f) V2X message reception over PC5 during V2X message reception over LTE-Uu. A V2X message is transmitted only over LTE-Uu.

For the cases including V2X message transmission (i.e., a), b), d), and e)) among a) to f), the UE may always determine them. Or the UE may determine only a case satisfying a predetermined condition on the basis of one or more of i) to iii).

i) UE type: whether a UE is a vehicle or a pedestrian (or a UE owned by an individual), and if the UE is a vehicle, what is the type of the vehicle (e.g., a general vehicle or a special-purpose vehicle (ambulance, a police car on duty, a vehicle loaded with a dangerous material, a school bus, public transportation, and so on).

ii) The type of a V2X message that the UE intends to transmit: for example, whether the V2X message is used for the purpose of road safety or not.

iii) The priority level of the V2X message that the UE intends to transmit.

For example, if the UE is a special-purpose vehicle, a) may be determined. In another example, if the priority level of a V2X message to be transmitted by the UE is higher than a predetermined priority level, d) may be determined. In another example, if the UE is a special-purpose vehicle and the priority level of a V2X message to be transmitted by the UE is higher than the predetermined priority level, e) may be determined.

Figure 13:
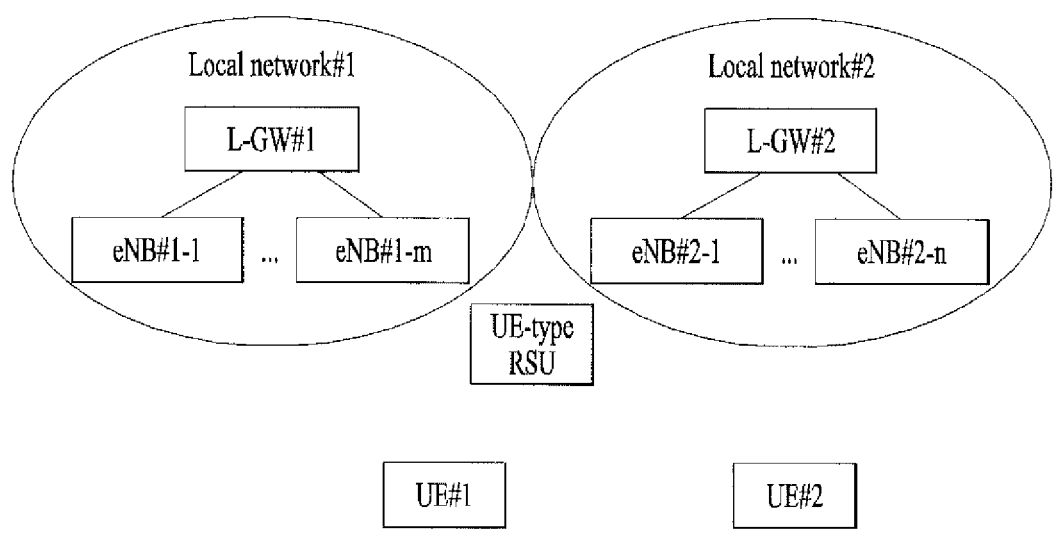
FIGS. 13 and 14 are views depicting an embodiment of the present disclosure.

An RSU may be fixed between the first local network and the second local network. For example, as illustrated in FIG. 13, the RSU may be located between local network #1 and local network #2. Unlike this case, two RSUs may be deployed, one of the RSUs may receive/provide a V2X service through local network #1, and the other RSU may receive/provide a V2X service through local network #2. The RSU may receive or provide a V2X service through local network #1, and receive or provide a V2X service through local network #2. Or the RSU may receive/provide a V2X service through a plurality of local networks, that is, both of local network #1 and local network #2 in FIG. 13. If the RSU is required to perform uplink transmission, the RSU may establish SIPTO@LN PDN connections with all of the local networks. Further, the RSU may receive traffic from all of the local networks.

The RSU may perform uplink transmission on a V2X message received from the UE via the PC5 interface to a local network(s) serving the RSU. Further, the RSU may forward downlink traffic received from the local network(s) serving the RSU to UEs via PC5 interfaces. The RSU may determine whether to transmit a V2X message received from a UE via a PC5 interface to a V2X application server via its PDN connection or to other UEs via PC5 interfaces, on the basis of the contents of the V2X message (this means the contents of a V2X Application message) and/or a configured configuration. If the RSU receives a V2X message from a UE via a PC5 interface and transmits the received V2X message to the V2X application server, the RSU interprets the V2X message in the application layer, and transmits the V2X message in the same manner as a V2X message generated by the RSU, that is, the V2X message with the IP address of the RSU set as a source IP address to the V2X application server. However, the contents of the V2X application message are contents that the UE has generated. In view of the nature of the V2X service, when the V2X application layer needs to interpret the contents of a V2X message and forward/distribute the V2X message, the V2X application layer retransmits the V2X message. Even though the V2X application server receives the V2X message from the UE through the RSU, the application layer of the V2X application server may receive the V2X message included by the UE. That is, irrespective of whether the V2X message transmitted by the UE is transmitted to the V2X application server through the RSU and then transmitted to UEs neighboring to the transmitting UE via the RSU, or the V2X message transmitted by the UE is transmitted to the UEs neighboring to the transmitting UE via the RSU, the contents of an application message of the V2X message generated by the transmitting UE are maintained.

In the case where an RSU is deployed in each local network, upon receipt of a V2X message from a UE via a PC5 interface, an RSU may perform uplink transmission on the V2X message to a local network(s) serving the RSU, and/or forward the V2X message to a neighbor RSU. Similarly, when the RSU receives downlink traffic from the local network(s) serving the RSU, the RSU may also forward the downlink traffic to UEs via PC5 interfaces, and/or to a neighbor RSU.

Meanwhile, when a UE transmits a V2X message to an RSU, the UE may set the destination of the message as a Layer-2 ID indicating the RSU. Herein, the UE may skip a one-to-one link setup procedure with the RSU. For details, refer to the following description of Embodiment 2.

Figure 14:
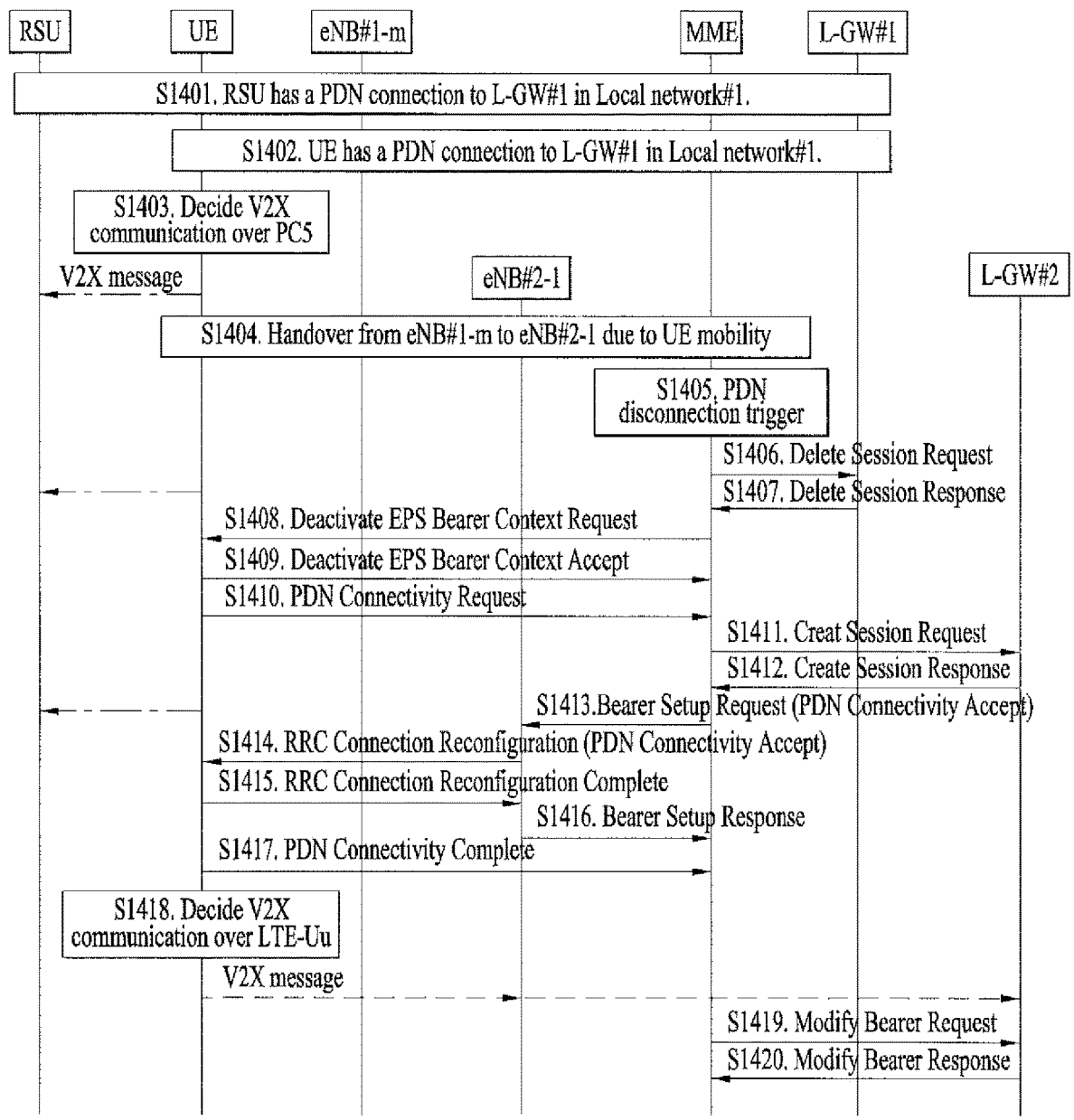

FIG. 14 illustrates an operation of network nodes according to Embodiment 1, when a UE moves from eNB#1-*m* belonging to local network#1 to eNB#2-1 belonging to local network#2 in the local network scenario. As the UE moves to the new local network, the PDN connection that the UE has established with L-GW#1 in the old local network, local network #1 is released. Thus, L-GW#2 in local network #2 should reconfigure a PDN connection. According to the present disclosure, the UE may receive a V2X service seamlessly through direct communication with an RSU until the PDN connection is reconfigured, which will be described stepwise in detail.

In step S1401, a UE-type RSU is a UE without mobility, and a UE has established a PDN connection with L-GW#1 in local network #1. In step S1402, the UE has the PDN connection to L-GW#1 in local network #1. The UE may transmit a V2X message via the PDN connection. In step 1403, the UE may determine to receive a V2X service over PC5, discontinuing reception of the V2X service over LTE-Uu. That is, the UE may determine to transmit a V2X message to the RSU. Thus, the UE transmits the V2X message to the RSU via the PC5 interface. The operations of the UE and the RSU have been described in detail before, and thus will not be described herein. The determination to transmit a V2X message over PC5 may also be made in step S1404.

Steps S1404 to S1417 are identical to steps S1202 to S1215 of FIG. 12, and thus the description of steps S1202 to S1215 is applied to steps S1404 to S1417. The UE transmits a V2X message to the RSU during a time period spanning between steps S1404 and S1417 (the time period may correspond to the afore-described SIPTO period). This V2X message includes a periodic V2X message, and a V2X message which may be generated upon occurrence of an event.

In step S1418, the UE determines to receive the V2X service over LTE-Uu, discontinuing the V2X service over PC5. That is, the UE determines to transmit a V2X message via a reconfigured PDN connection. Thus, the UE transmits the V2X message to a V2X application server via the PDN connection.

Steps S1419 and S1420 are identical to steps S1216 and S1217 in FIG. 12, and thus the description of steps S1216 and S1217 is applied to steps S1419 and S1420.

Embodiment 2

The second embodiment relates to a method for reducing a delay involved in transmission of a V2X message from a UE to an RSU. When a legacy UE transmits a V2X message to an RSU, an operation for recognizing the RSU by a direct discovery procedure, and a subsequent operation for establishing a direct one-to-one link are required. However, if both of these operations are performed, PC5 radio resources are consumed. Particularly, a large number of vehicles may transmit their travel information or traffic information to the RSU in V2X. This case may be more burdening in terms of radio resources. Transmission and reception of a V2X message between a UE and an RSU via a PC5 interface has also been described in Embodiment 1.

If the UE transmits a V2X message in an IP-based message transmission scheme (i.e., if the UE transmits a V2X message in the form of an IP packet by IP-based transmission), the UE may set the destination layer-2 ID of the transmission message to a Layer-2 ID indicating the RSU and/or set the destination IP address of the transmission message to an IP address indicating the RSU. The message configured as such may be transmitted by direct communication (this may be one-to-many direct communication). In this case, particularly the direct discovery procedure and the direct one-to-one link setup procedure between a UE and a UE-type RSU may not be performed.

Only when a receiving UE executes an RSU function (i.e., a UE-type RSU), the receiving UE functions to transmit the Layer-2 ID and IP address indicating the RSU to its application layer. Thus, if a UE without the RSU function receives the message, the UE does not transmit the message to its application layer by filtering the message on the basis the Layer-2 ID and IP address. That is, the UE discards the message.

If the UE transmits a V2X message by a message transmission scheme which is not IP-based (i.e., an IP-less message transmission scheme), the UE may set the destination Layer-2 ID of the transmission message to the Layer-2 ID indicating the RSU. This message may be transmitted by direct communication (this may be one-to-many direct communication). Only when a receiving UE executes an RSU function (i.e., a UE-type RSU), the receiving UE functions to transmit the Layer-2 ID to its application layer. Thus, if a UE without the RSU function receives the message, the UE does not transmit the message to its application layer by filtering the message on the basis the Layer-2 ID. That is, the UE discards the message. For Layer-2 ID configuration in the foregoing method, refer to the contents of TS 36.321. Additionally, when a message is transmitted in the above method, a PDU type (=SDU type) in a PDCH header may be set to a value indicating that the message is transmitted to an RSU. Thus, the information may additionally be used in filtering of the received message.

The Layer-2 ID and IP address indicating the RSU may be preconfigured for the UE or provided by the network. Or the RSU may provide the Layer-2 ID and the IP address.

If the network provides the Layer-2 ID and the IP address indicating the RSU, various network nodes/functions may provide the Layer-2 ID and the IP address indicating the RSU, such as an eNB, an MME, and a network function responsible for configuring parameters (e.g., a ProSe Function, a V2X Function, or the like). For example, if the eNB provides the Layer-2 ID and the IP address indicating the RSU, the eNB may provide the Layer-2 ID and the IP address indicating the RSU to the UE by an SIB message or dedicated signaling. If the MME provides the Layer-2 ID and the IP address indicating the RSU, the MME may provide the Layer-2 ID and the IP address indicating the RSU to the UE by a NAS message. If the RSU provides the Layer-2 ID and the IP address indicating the RSU, the RSU may periodically announce the Layer-2 ID and the IP address to the UE by a PC5 discovery message. The PC5 discovery message may be a 132-bit PC5-D message, or a newly defined PC5 message. In the latter case, the size of the PC5 message may be limited to 232 bits so that the PC5 message may be transmitted at one time. The discovery message may indicate that this message includes information about the RSU. Herein, the discovery message may specifically indicate service for which the included address information is used. For example, it may indicate that the included address information is for traffic information collection, accident occurrence registration, driving information collection, parking lot management, or the like. Thus, an RSU providing various services may use different addresses according to services (different Layer-2 IDs and/or different IP addresses), and thus may announce corresponding address information in a discovery message including service information for all services that the RSU provides.

Layer-2 IDs/IP addresses indicating RSUs may enable RSUs in an area in which a UE is located to receive a V2X message transmitted by the UE, in various ranges/with various granularities. For example, a Layer-2 ID/IP address may be configured in various units such as per PLMN(s), per geo-location, per eNB(s), per MME(s), per cell(s), per tracking area(s), per TAI list, and per frequency(s) to be used for direction communication. Further, a Layer-2 ID/IP address may indicate one or more RSUs. In the latter case, if a UE transmits a V2X message with a destination set to the Layer-2 ID/IP address over PC5, and a plurality of RSUs use the Layer-2 ID/IP address in the communication range of the UE, the plurality of RSUs may transmit the received v2X message to their application layers.

If an RSU is the destination of the V2X message, the RSU may transmit the V2X message received from the UE to its application layer. Unlike this operation, the RSU may perform a different operation, determining that the RSU is a destination. For example, the UE may perform such an operation as forwarding to another RSU, forwarding to another UE, forwarding to a V2X application server in the network, or the like.

While the RSU may use the Layer-2 ID/IP address indicating the RSU only in receiving a V2X message (i.e., to recognize that the RSU is a destination), the RSU may not use the Layer-2 ID/IP address in transmitting a V2X message over PC5. That is, a different Layer-2 ID/IP address from the Layer-2 ID/IP address may be used as a source Layer-2 ID/IP address. Or one of the Layer-2 ID and the IP address may be used in the same manner, whereas the other may be used in a different manner.

If the RSU receiving the V2X message from the UE determines to forward the received V2X message to a neighbor RSU(s), the RSU may transmit the V2X message to the neighbor RSU(s) by one-to-one direct communication. For this purpose, the RSU may establish a one-to-one link with the neighbor RSU(s) in a deployment phase.

If the RSU uses the IP-based transmission scheme in forwarding the V2X message received from the UE to the neighbor RSU(s), the RSU may set a source Layer-2 ID/IP address to its Layer-2 ID/IP address, and a destination Layer-2 ID and a destination IP address to a Layer-2 ID and an IP address of the neighbor RSU(s). If the RSU uses the IP-less transmission scheme in forwarding the V2X message, the RSU may set the source Layer-2 ID to its Layer-2 ID, and the destination Layer-2 ID to the Layer-2 ID of the neighbor RSU(s).

If the RSU receiving the v2X message determines to forward the V2X message to the neighbor RSU(s), the RSU may transmit the V2X message to the neighbor RSU(s) by one-to-many direction communication. If the RSU uses the IP-based transmission scheme in forwarding the V2X message received from the UE to the neighbor RSU, the RSU may set the source Layer-2 ID and source IP address to its Layer-2 ID and IP address, and the destination Layer-2 ID and the destination IP address to the Layer-2 ID and IP address of the neighbor RSU(s). If the RSU uses the IP-less transmission scheme in forwarding the V2X message, the RSU may set the source Layer-2 ID to its Layer-2 ID, and the destination Layer-2 ID to the Layer-2 ID of the neighbor RSU(s).

If the RSU, which has received the V2X message from the UE, determines to transmit a V2X message (e.g., a response to the message transmitted by the UE, V2X information provided by the RSU, or the like) to the UE as a target, the RSU may transmit the V2X message by one-to-may direct communication. This means that the RSU does not perform a procedure for separately establishing a link/connection with the UE, for the one-to-many direct communication. Thus, this may be referred to as one-to-one direct communication without establishing a one-to-one link/connection.

If the RSU uses the IP-based transmission scheme in transmitting the V2X message to the UE, the RSU sets a source Layer-2 ID and a source IP address to its Layer-2 ID and IP address, and a destination Layer-2 ID and a destination IP address to the Layer-2 ID and IP address of the UE. If the RSU uses an IP-less transmission scheme in transmitting the V2X message, the RSU may set the source Layer-2 ID to its Layer-2 ID, and the destination Layer-2 ID to the Layer-2 ID of the UE. The Layer-2 ID/IP address of the UE may be acquired from the V2X message transmitted by the UE. That is, Layer-2 ID/IP address of the UE may be acquired from the source Layer-2 ID and source IP address of the V2X message.

Figure 15:
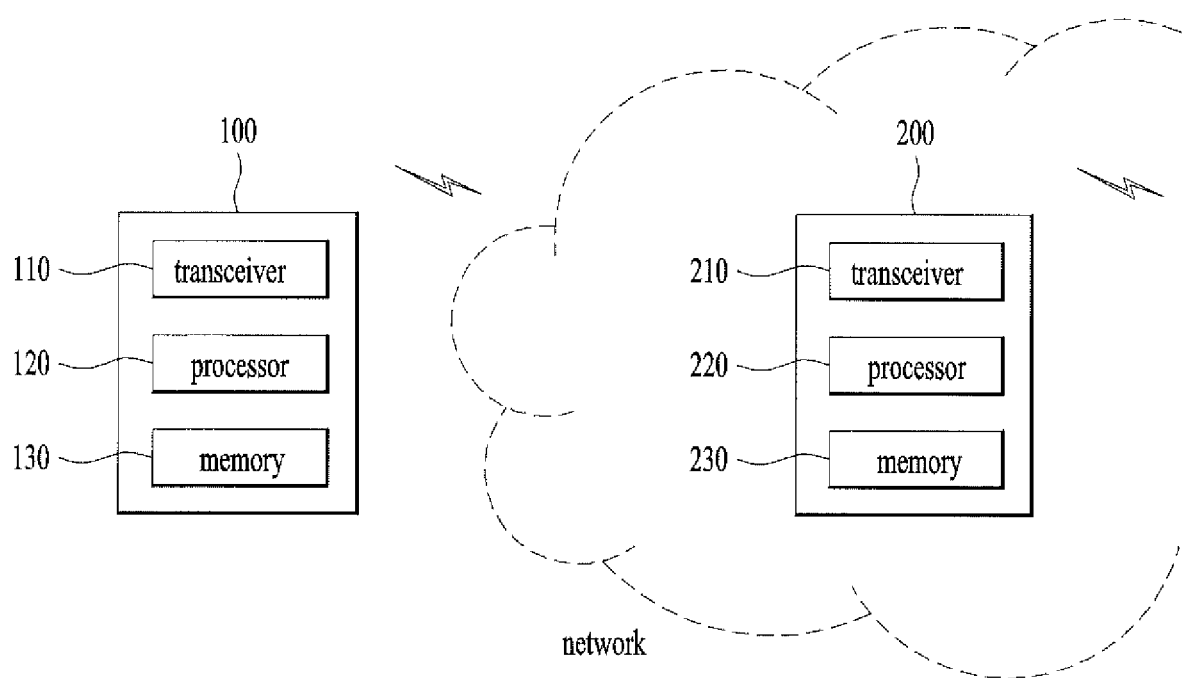
FIG. 15 is a view illustrating an exemplary configuration of a node device according to an embodiment of the present disclosure.

FIG. 15 is a view illustrating a preferred embodiment of the configurations of a UE and a network node according to an example of the present disclosure.

Referring to FIG. 15, a UE 100 according to the present disclosure may include a transceiver 110, a processor 120, and a memory 130. The transceiver 110 may be configured to transmit various signals, data, and information to an external device, and receive various signals, data, and information from an external device. The UE 100 may be connected wiredly and/or wirelessly to an external device. The processor 120 may be configured to provide overall control to the UE 100, and to function to compute and process information to be transmitted to and information received from the external device in the UE 100. The memory 130 may store the computed and processed information for a predetermined time, and may be replaced with a component such as a buffer (not shown). Further, the processor 120 may be configured to perform the UE operations proposed in the present disclosure. Specifically, the processor may receive a V2X message through the transceiver via a long term evolution (LTE) Uu interface of a first local network, receive local network boundary-related information from a first eNB of the first local network through the transceiver, and determine to perform one or more of V2X message transmission or reception via a PC5 interface during an SIPTO period on the basis of the local network boundary-related information.

Referring to FIG. 15, a network node 20 according to the present disclosure may include a transceiver 210, a processor 220, and a memory 230. The transceiver 210 may be configured to transmit various signals, data, and information to an external device, and receive various signals, data, and information from an external device. The network node 200 may be connected wiredly and/or wirelessly to an external device. The processor 220 may be configured to provide overall control to the network node 200, and to function to compute and process information to be transmitted to and information received from the external device in the network node 200. The memory 230 may store the computed and processed information for a predetermined time, and may be replaced with a component such as a buffer (not shown). Further, the processor 220 may be configured to perform the operations of a network node, proposed in the present disclosure.

The specific configurations of the UE 100 and the network node 200 may be implemented such that the above-described various embodiments of the present disclosure are independently applied or two or more thereof are simultaneously applied, and description of redundant parts is omitted for clarity.

The embodiments of the present disclosure may be achieved by various means, for example, hardware, firmware, software, or a combination thereof.

In a hardware configuration, the embodiments of the present disclosure may be achieved by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In a firmware or software configuration, a method according to embodiments of the present disclosure may be implemented in the form of a module, a procedure, a function, etc. Software code may be stored in a memory unit and executed by a processor. The memory unit is located at the interior or exterior of the processor and may transmit and receive data to and from the processor via various known means.

As described before, a detailed description has been given of preferred embodiments of the present disclosure so that those skilled in the art may implement and perform the present disclosure. While reference has been made above to the preferred embodiments of the present disclosure, those skilled in the art will understand that various modifications and alterations may be made to the present disclosure within the scope of the present disclosure. For example, those skilled in the art may use the components described in the foregoing embodiments in combination. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

INDUSTRIAL APPLICABILITY

While the above various embodiments of the present disclosure have been described in the context of the 3GPP system, they are applicable in the same manner to various mobile communication systems.

The invention claimed is:

1. A method for transmitting and receiving a vehicle to everything (V2X) message by a user equipment (UE) in a wireless communication system, the method comprising:
   transmitting and receiving a V2X message via a long term evolution (LTE) Uu interface of a first local network;
   receiving local network boundary-related information from a first base station (BS) of the first local network; and
   determining to perform one or more of V2X message transmission or V2X message reception via a PC5 interface during a selected IP traffic offload at local network (SIPTO) period on the basis of the local network boundary-related information.

2. The method according to claim 1, further comprising, if it is determined to perform one or more of V2X message transmission or V2X message reception via the PC5 interface, performing one or more of V2X message transmission to a road side unit (RSU) or V2X message reception from an RSU.

3. The method according to claim 2, wherein the RSU is fixed between the first local network and the second local network.

4. The method according to claim 3, wherein the UE omits a one-to-one link setup procedure with the RSU.

5. The method according to claim 2, wherein when the UE transmits the V2X message to the RSU, the UE sets a message destination to a Layer-2 ID indicating the RSU.

6. The method according to claim 1, wherein the UE re-configures a PDN connection with the first local network as a PDN connection with a second local network, during the SIPTO period.

7. The method according to claim 1, wherein the local network boundary-related information includes one or more of information indicating that a BS is at a local network boundary, information indicating that a local network is changed, information indicating that a cell is at the local network boundary, information indicating the presence of an RSU at the local network boundary, ID information about the RSU, or information about a time of conducting direct communication with the RSU.

8. The method according to claim 1, wherein if the UE does not receive the local network boundary-related information any longer, the UE determines to transmit or receive a V2X message via an LTE Uu interface.

9. The method according to claim 1, wherein if the SIPTO period has elapsed, the UE determines to transmit or receive a V2X message via an LTE Uu interface.

10. The method according to claim 1, wherein if the UE receives one or more of information indicating that a BS is not at a local network boundary, information indicating that a local network is not changed, information indicating that a cell is not at the local network boundary, or information indicating the absence of an RSU, the UE determines to transmit or receive a V2X message via an LTE Uu interface.

11. The method according to claim 1, wherein the SIPTO period is one of a time corresponding to time information about direct communication with an RSU, a time from the reception of the local network boundary-related information to no longer reception of the local network boundary-related information, and a time from the reception of the local network boundary-related information to reception of one or more of information indicating that a BS is not at a local network boundary, information indicating that a local network is not changed, information indicating that a cell is not at the local network boundary, or information indicating the absence of an RSU.

12. The method according to claim 1, wherein V2X message transmission or V2X message reception via the PC5 interface is determined according to a type of the UE, a type of a V2X message, or a priority level of the V2X message.

13. A user equipment (UE) for transmitting and receiving a vehicle to everything (V2X) message in a wireless communication system, the UE comprising:
   a transceiver; and
   a processor,
   wherein the processor is configured to transmit and receive a V2X message through the transceiver via a long term evolution (LTE) Uu interface of a first local network, to receive local network boundary-related information from a first base station (BS) of the first local network through the transceiver, and to determine to perform one or more of V2X message transmission or V2X message reception via a PC5 interface during a selected IP traffic offload at local network (SIPTO) period on the basis of the local network boundary-related information.

* * * * *